FIG. 1

INVENTOR
ANDREW B. JACOBSEN
LOUIS A. TURNER
ATTORNEY

Aug. 25, 1959   A. B. JACOBSEN ET AL   2,901,743
RADAR TELEMETERING SYSTEM
Filed Jan. 5, 1946   4 Sheets-Sheet 2

FIG. 2

INVENTOR
ANDREW B. JACOBSEN
LOUIS A. TURNER
BY
ATTORNEY

INVENTOR
ANDREW B. JACOBSEN
LOUIS A. TURNER
BY
m.a.Hayes
ATTORNEY

United States Patent Office 2,901,743
Patented Aug. 25, 1959

2,901,743

RADAR TELEMETERING SYSTEM

Andrew B. Jacobsen, Somerville, Mass., and Louis A. Turner, Princeton, N.J., assignors, by mesne assignments, to the United States of America as represented by the Secretary of the Navy Application January 5, 1946, Serial No. 639,282

9 Claims. (Cl. 343—6.5)

This invention relates to a system for transmitting data received by a radar system to a point remote from the system. More particularly, it relates to the alternate transmission of two types of such data over one transmission link.

Electromagnetic energy pulse transmission is now well-known to the art; numerous radar echo ranging systems employ it as a basic principle of operation. Recent developments in this field have included such radar echo ranging devices carried aboard aircraft, the information received aboard the aircraft from these devices being relayed by supplementary means to a remote ship or land station. Such systems are described more fully in U.S. patent applications, Serial Nos. 592,794 and 594,-258, filed May 9, 1945, and May 17, 1945, by Stanley N. Van Voorhis, now U.S. Patents Nos. 2,698,931 and 2,567,862, respectively. In relaying such synchronizing information as described in this patent application, it is important that military security be preserved and also that there be no confusion as a result of spurious interference such as atmospheric noise or other electromagnetic radiation. Accordingly, a system for coding such synchronizing information has been developed, and is described more fully in patent application Serial Number 617,365 for a "Coded Data Transmission System," filed September 19, 1945, by Andrew B. Jacobsen.

In addition, it is extremely important for the operator in the above-mentioned aircraft to be capable of identifying as friendly or enemy, any object or target appearing on his indicators. Such an identification scheme consists of a pulsed radio transmitter which may be activated at the will of the operator and which will cause certain known radiations to be returned from friendly targets. This scheme is well-known to the art and will be referred to hereinafter as the identification of friend or foe system, or simply I.F.F. The pulsed transmitter used in the I.F.F. system aboard the above-mentioned aircraft will be known hereinafter as the interrogator. The receiver, located aboard the aircraft, which will detect and interpret responses from friendly targets will be known as the responsor. The output of the responsor will be known as the I.F.F. video and the output of the radar receiver will be known as the radar video, since these two outputs contain frequencies now known to the art as video frequencies.

Great military value would be realized if the identification data returned from friendly targets, after being converted to the form of I.F.F. video, could be transmitted to the remote ship or shore station to which radar video information is being relayed.

Accordingly, it is an object of this invention to provide means for relaying I.F.F. information and radar information over the same relay link to a remote point through the use of radio signals.

Another object is to accomplish the relaying of I.F.F. information to a remote point with a minimum of interference to the relaying of radar information to the same point.

A further object is to provide means for selection of one out of two possible frequency bands for performing the required identification of friend or foe, and for distinguishing at the remote ship or land station which frequency band has been selected.

Still another object is to provide means for suitable presentation of the I.F.F. information at the ship or land station in accordance with the frequency band selected.

Other objects of the invention will become apparent in the course of the following description when taken with the accompanying drawings, in which.

Figure 1:
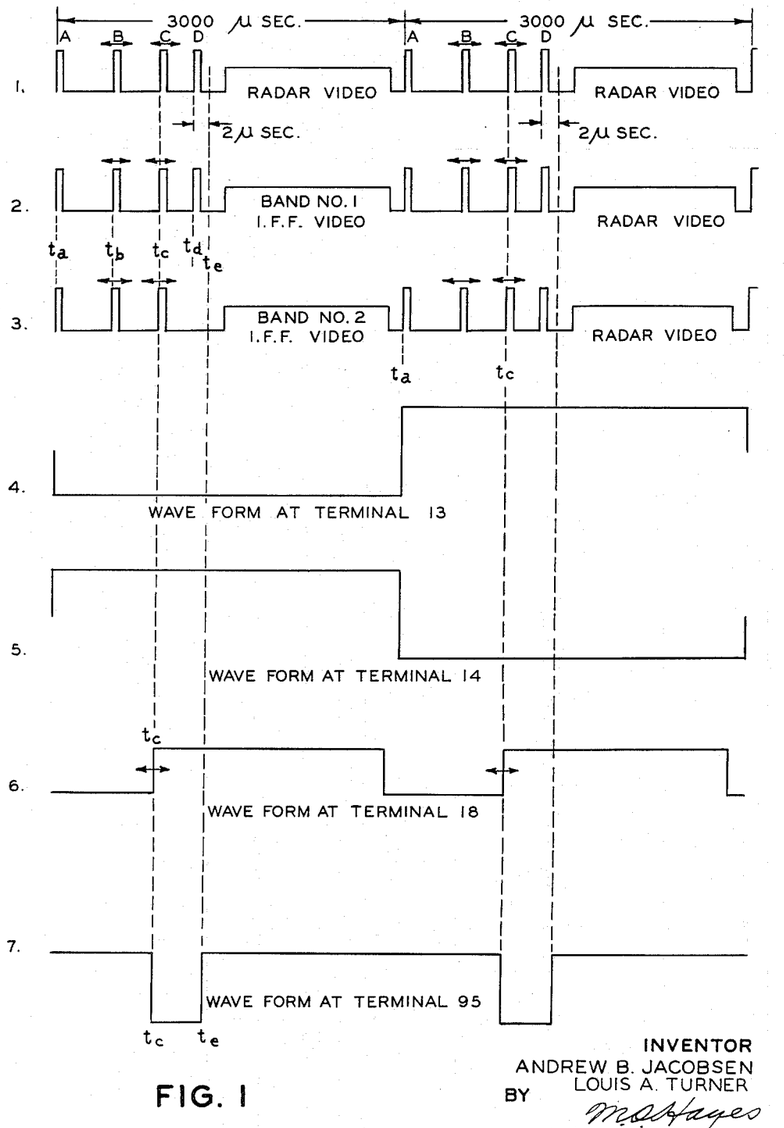
Fig. 1 is a timing diagram useful in explaining relationships in one embodiment of the invention.

Sufficient information must be transmitted down the relay link to indicate azimuth and range of detected objects. The system used, in general, is that described in the aforementioned patent application of Van Voorhis. The timing sequences indicated on Fig. 1 are coded and then transmitted over the relay link in a conventional manner by means of a frequency modulated or amplitude modulated radio transmitter, and are received at the remote ship or land station by a suitable receiver. Line 1 of Fig. 1 represents the sequence of events occurring for two repetition cycles when the equipment is being used to transmit only radar information over the relay link. Pulse A initiates the start of each repetition cycle. Pulses B and C are synchronizing pulses which follow pulse A at a time dependent upon the azimuth of the radar antenna at the instant pulse A occurs. Arrows over the pulses indicate that they vary in phase as the antenna rotates. Pulse D occurs simultaneously with the radar transmitted pulse. The purpose of pulse D is to initiate the sweeps of indicator tubes at the remote ship or shore station.

Line 2 of Fig. 1 represents the conditions obtained during use of the band #1 I.F.F. transpondor. Pulses A, B, C and D are present during each cycle, but it is noted that on the first cycle (and on all succeeding odd-numbered cycles), pulse D is followed by band #1 I.F.F. video responses instead of by radar video responses.

Likewise, line 3 of Fig. 1 indicates that when using the band #2 I.F.F. interrogator, the first cycle (and all succeeding odd-numbered cycles) contains pulses A, B, and C followed by band #2 I.F.F. video (pulse D being omitted), whereas the second cycle (and all succeeding even-numbered cycles) contains pulses A, B, C and D followed by radar video. The reasons for differences in these three conditions of operation (lines 1, 2 and 3 of Fig. 1) will become apparent in the discussion of the equipment located at the remote ship or land station. It will be noted that during the use of either I.F.F. interrogator, I.F.F. video and radar video signals will be transmitted down the relay link in interlaced fashion on alternate cycles. Pulses A, B, C and D are represented as single blocks, but in order to preserve military security, are actually coded before transmission over the relay link as described in the patent application of Jacobsen mentioned above.

Figure 2:
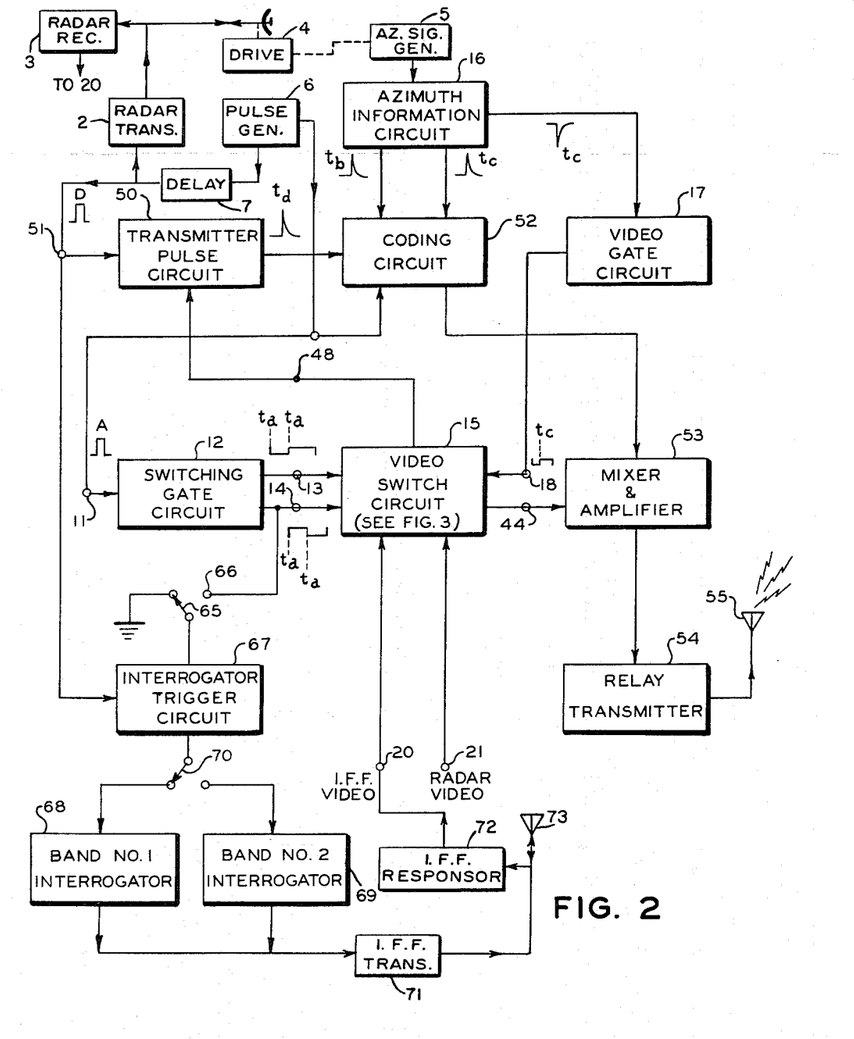
Fig. 2 illustrates in block diagram form one embodiment of the portion of the invention located aboard the aircraft.

Fig. 2 shows in block diagram form a method of accomplishing the desired results at the aircraft location. Wave forms shown on this and other figures are approximate in shape and are intended only to show timing sequences. Letters on the wave forms indicate time of occurrence. Radar system synchronizing pulse A, occurring at time $t_a$ is received at input terminal 11 from a pulse generator 6. This generator, besides serving as the source of the A pulses, also provides the D pulses, and these last-mentioned pulses may simply be obtained by subjecting each A pulse to a fixed amount of delay in delay line 7 before their application to the transmitter pulse circuit 50 and the interrogator trigger circuit 67. It will thus be seen that pulse D activates the radar transmitter 2 and, by selective operation of switch 70, either band No. 1 or band No. 2 interrogator. This pulse may be repeated once every 3000 microseconds, synchronized with the radar system and is fed to switching gate circuit 12. Switching gate 12 may be a conventional synchronized multivibrator generating two rectangular waves of opposite phase, each portion of each wave starting simultaneously with pulse A, and being of 3000 microseconds duration. These waves are indicated at terminals 13 and 14 (Fig. 3) and on lines 4 and 5 respectively of Fig. 1. Terminals 13 and 14 are connected to video switch circuit 15.

Pulses B and C are generated in accordance with radar antenna azimuth information in azimuth information circuit 16. These pulses are obtained from an azimuth signal generator 5 which can take the form of the circuit shown in Patent No. 2,567,862 which issued September 11, 1951, to S. N. Van Voorhis. A negative pulse occurring at time $t_c$ coincident with pulse C is fed to video gate circuit 17. The term gate will be used hereinafter to designate a voltage having substantially square or rectangular wave form. Video gate circuit 17 generates a gate whose leading edge occurs at time $t_c$, as shown on line 6 of Fig. 1. This gate is fed to terminal 18 and thence to video switch circuit 15.

The video outputs of the I.F.F. responsor and the radar receiver are fed to terminals 20 and 21 respectively and thence to video switch circuit 15.

Figure 3:
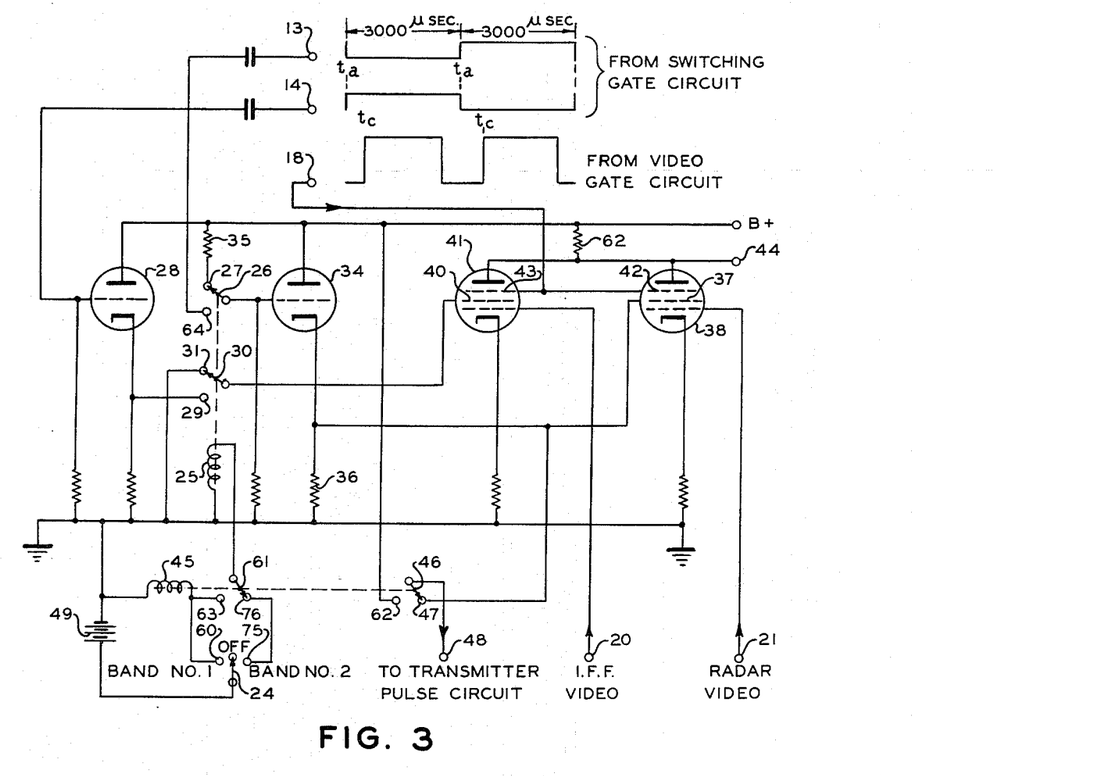
Fig. 3 is a schematic diagram of a portion of Fig. 2.

Fig. 3 is a schematic diagram of video switch circuit 15. The inputs to this circuit have been described above and are received on terminals 13, 14, 18, 20 and 21, identically numbered on Figs. 2 and 3. All switches and relays on Fig. 3 are shown in the position for radar operation only as defined by the timing cycle shown on line 1 of Fig. 1. I.F.F. switch arm 24 is in the "off" position. Under these conditions relay coil 25 is not energized and arm 26 of this relay is connected to contact 27. Thus, the input at terminal 13 is not used. The input at terminal 14 is connected to the grid of triode tube 28. The output of tube 28 is taken from its cathode and connected to contact 29 of relay 25. However, arm 30 of this relay is connected to ground through contact 31. Since the grid of triode tube 34 is held at a high potential by means of the connection through arm 26, contact 27 and resistor 35 to B+, tube 34 is conducting, and a voltage nearly equal to the B+ supply voltage will be developed across cathode resistor 36. This high voltage is connected directly to second grid 37 of pentode tube 38, enabling it to conduct. At the same time, second grid 40 of pentode tube 41 is connected through arm 30 and contact 31 to ground, thus preventing tube 41 from conducting. Since the wave form at terminal 18 (line 6 of Fig. 1) is connected directly to third grids 42 and 43 of tubes 38 and 41 respectively, either of these tubes can pass video signals applied to their first grids only when its second and third grid are simultaneously positive in polarity.

From the above explanation it may be seen that the purpose of the wave form at terminal 18 is to prevent transmission by tubes 38 and 41 of any video signals occurring before time $t_c$. This is to prevent possible confusion arising from transmission of video signals during the time of occurrence of the synchronizing signals. Under the conditions outlined above, tube 41 is cut-off because its second grid 40 is grounded, and tube 38 conducts for the duration of the positive portion of the wave form shown on line 6 of Fig. 1, starting at time $t_c$. Thus I.F.F. video signals are cut off by tube 41, and radar video signals are passed by tube 38 to terminal 44 for a time beginning with pulse C. Relay coil 45 is not energized. Arm 46 of relay 45 is on contact 47 which is connected to the cathode of tube 34. The high positive voltage across resistor 36 is connected to terminal 48 and thence to transmitter pulse circuit 50 (Fig. 2).

Returning now to Fig. 2, pulse D appears once during each repetition cycle at terminal 51. Pulse D is derived from the radar transmitter, and occurs simultaneously with the radar transmitter pulse. It is fed from terminal 51 to transmitter pulse circuit 50. When the voltage at terminal 48 is high, each pulse D is passed through transmitter pulse circuit 50, where it is sharpened and fed to coding circuit 52 in the form of a pip. Coding circuit 52 also receives pulse A from terminal 11, and pulses B and C from azimuth information circuit 16. These four pulses (A, B, C and D), are mixed and coded and then fed to mixer and amplifier 53. Here they are mixed with the video signals, appearing at terminal 44. The combination of pulses and video signals is amplified to the correct voltage level, and fed to relay transmitter 54 where it modulates the transmitter and is radiated through transmitter antenna 55 to the remote ship or shore station.

If it is desired to use band #1 I.F.F. interrogator 68 (Fig. 2) on the timing cycle defined by line 2 of Fig. 1, arm 24 (Fig. 3) is placed on contact 60. This energizes coil 45 from battery 49. Coil 45 causes arms 46 and 61 to move to contacts 62 and 63, respectively. Hence coil 25 is also energized through arm 61 and contact 63, and arms 26 and 30 are moved to contacts 64 and 29, respectively. The above switching connects terminal 13 to the grid of triode tube 34, second grid 40 of tube 41 to the cathode of triode tube 28, and terminal 48 to the B+ supply. It is evident that pentode tube 38 will receive on its second grid 37, the wave form at terminal 13 through cathode follower action of tube 34. Likewise, pentode tube 41 will receive on its second grid 40 the wave form at terminal 14 through cathode follower action of tube 28. Both pentode tubes 38 and 41 receive the wave form at terminal 18 on their third grids 42 and 43, respectively. Thus, tubes 38 and 41 will conduct on alternate cycles determined by the wave forms at terminals 13 and 14, respectively. Since tubes 38 and 41 operate into a common load resistor 62, the output at terminal 44 will consist alternately of I.F.F. video from terminal 20 through tube 41, and radar video from terminal 21 through tube 38.

Referring to Fig. 2, terminal 48 is held at B+ voltage, thus passing a pulse from transmitter pulse circuit 50 to coding circuit 52 on each repetition cycle. Also, arm 65 is placed on contact 66, connecting interrogator trigger circuit 67 to terminal 14. Interrogator trigger circuit 67 receives pulse D from terminal 51 and developes it into a sharp trigger. The circuit (67) is operative only when arm 65 is at a high positive potential. Since arm 65 is connected through contact 66 to terminal 14, it is evident that interrogator trigger circuit 67 will be operative on odd-numbered repetition cycles only. It is on those odd-numbered cycles that tube 41 (Fig. 3) permits passage of I.F.F. video. The output of interrogator trigger circuit 67 may be fed either to band #1 interrogator 68 or band #2 interrogator 69 through switch 70. The outputs of these interrogators frequency modulate the I.F.F. transmitter 71 and determine the signal radiated from the I.F.F. antenna 73. The I.F.F. video developed by I.F.F. responsor 72 and supplied to terminal 20 will come from band #1 responsor when band #1 interrogator is used. As described above for the case of radar operation only, synchronizing signals (pulses A, B, C and D) are coded in coding circuit 52, mixed with video signals in mixer and amplifier 53, and transmitted through relay transmitter 54 and antenna 55 to the remote ship or shore location.

If it is desired to use band #2 interrogator 69 (Fig. 2) on the timing cycle defined by line 3 of Fig. 1, arm 24 (Fig. 3) is placed on contact 75. Coil 25 is energized through arm 61, contact 76, contact 75 and arm 24 by battery 49. Coil 25 causes arms 26 and 30 to move to contacts 64 and 29, respectively, resulting in the same connections to tubes 38 and 41 as obtained during the use of band #1 interrogator 68. Note, however, that coil 45 is not energized. Terminal 48 remains connected through arm 46 and contact 47 to the cathode of tube 34, and receives a voltage having the same wave form as second grid 37 of tube 38. It is apparent that from the foregoing explanations of radar operation (line 1 of Fig. 1) and band #1 I.F.F. operation (line 2 of Fig. 1), that under the conditions outlined for band #2 I.F.F. operation, alternate cycles of I.F.F. video and radar video will appear at terminals 44. The wave form appearing at terminal 48 (similar to line 4 of Fig. 1) will result in suppression of pulse D in transmitter pulse circuit 50 on all odd-numbered cycles. Sychronizing signals will be coded, mixed with video signals, applied to relay transmitter 54 and transmitted through antenna 55 in the manner described for the two other modes of operation.

Three types of indicators may be used for data presentation at the remote ship or shore location. They may be designated as X indicators, delayed X indicators, and Y indicators. All indicators may be in the form of cathode ray tubes. For purposes of illustrating one mode of operation of the present invention, it will be assumed that the X and delayed X indicators are assigned the function of presenting radar video and band #1 I.F.F. video, that these indicators are not to present band #2 I.F.F. video, and that the Y indicator is to present radar video and band #2 I.F.F. video only.

It is understood that while only one of each type of indicator is shown in this embodiment (Fig. 4), any number of each type of indicator may be used in practice.

Signals emitted from transmitter antenna 55 (Fig. 2) may be received on receiver antenna 80 (Fig. 4) located at the remote ship or shore station. It is to be understood that any instant of time referred to in the explanation of the equipment located at the remote ship or shore station is considered time of arrival of pulses or signals at receiver antenna 80, since an indeterminate time will have elapsed after transmission from antenna 55 due to the distance between antenna 55 and 80.

Signals received on receiver antenna 80 (Fig. 4) are fed to relay receiver 81 where they are amplified and detected and fed in video form to separator and decoder 82, and to indicator jack 79 from whence they are applied to all indicator circuits. The signals received by separator and decoder 82 are a mixture of synchronizing pulses A, B, C, and D (if D is present), followed by I.F.F. or radar video, whichever is present. These signals are of the same character as those fed from mixer and amplifier 53 to relay transmitter 54 shown on Fig. 2. In separator and decoder 82, synchronizing pulses A, B, C, and D (if present) may be separated from video signals and decoded by means of a system similar to that disclosed in Jacobsen's above-mentioned patent application, or other means well known to the art. The synchronizing signals will now consist of pulses A, B, C, and D (if present) each in single pulse form as indicated on lines 1, 2, and 3 of Fig. 1. These pulses are fed simultaneously to sequence gating circuit 83 and pulse D amplifier 84. Sequence gating circuit 83 may comprise a series of multivibrator circuits, each triggered from the one preceding, with the first triggered by the reception of pulse A. Each pulse is separated from the others and routed where desired. Pulses B and C are selected and fed to sweep rotation circuits through jack 85. Pulse C is also sharpened by means of a conventional blocking oscillator circuit and fed to cut-off gate circuit 86 where it initiates operation of a multivibrator or other rectangular wave forming circuit. A long negative pulse starting at time $t_c$ is returned to sequence gating circuit 83 where it stops all action between the occurrence of pulse C and the succeeding pulse A, which marks the beginning of another repetition cycle. A similar long negative pulse starting at time $t_c$ is fed to pulse D gate circuit 87. This may be a conventional multivibrator whose action is initiated at time $t_c$ by the leading edge of the long pulse from cutoff gate circuit 86. A positive gate starting at time $t_c$ is fed from pulse D gate circuit 87 to pulse D amplifier 84. Since pulse D follows pulse C, the aforementioned gate (starting at time $t_c$) is adjusted to terminate approximately 2 microseconds after the time of occurrence of pulse D, or at time $t_e$. Pulse D amplifier is arranged to amplify signals only during the existence of this positive pulse from pulse D gate circuit 87. Thus, pulses A, B, and C will not be passed through pulse D amplifier 84, but pulse D, if present will be amplified and passed on to trigger output circuit 90. Trigger output circuit 90 may be a conventional blocking oscillator, forming the leading edge of pulse D into a sharp positive pip occurring at time $t_d$ when pulse D is present in the received signal. From trigger output circuit 90 this positive pip is fed to X indicator sweep circuit 91 where it is used to initiate the sweeps of X indicator 96 in a conventional manner. As explained above, radar video and band #1 I.F.F. video are suitable for display on X indicator 96. Therefore, since pulse D is used to trigger X indicator sweep circuit 91, this indicator will be used only for radar video and band #1 I.F.F. video since pulse D is absent on cycles containing band #2 I.F.F. video and no sweep will appear on X indicator 96 under these conditions.

Figure 4:
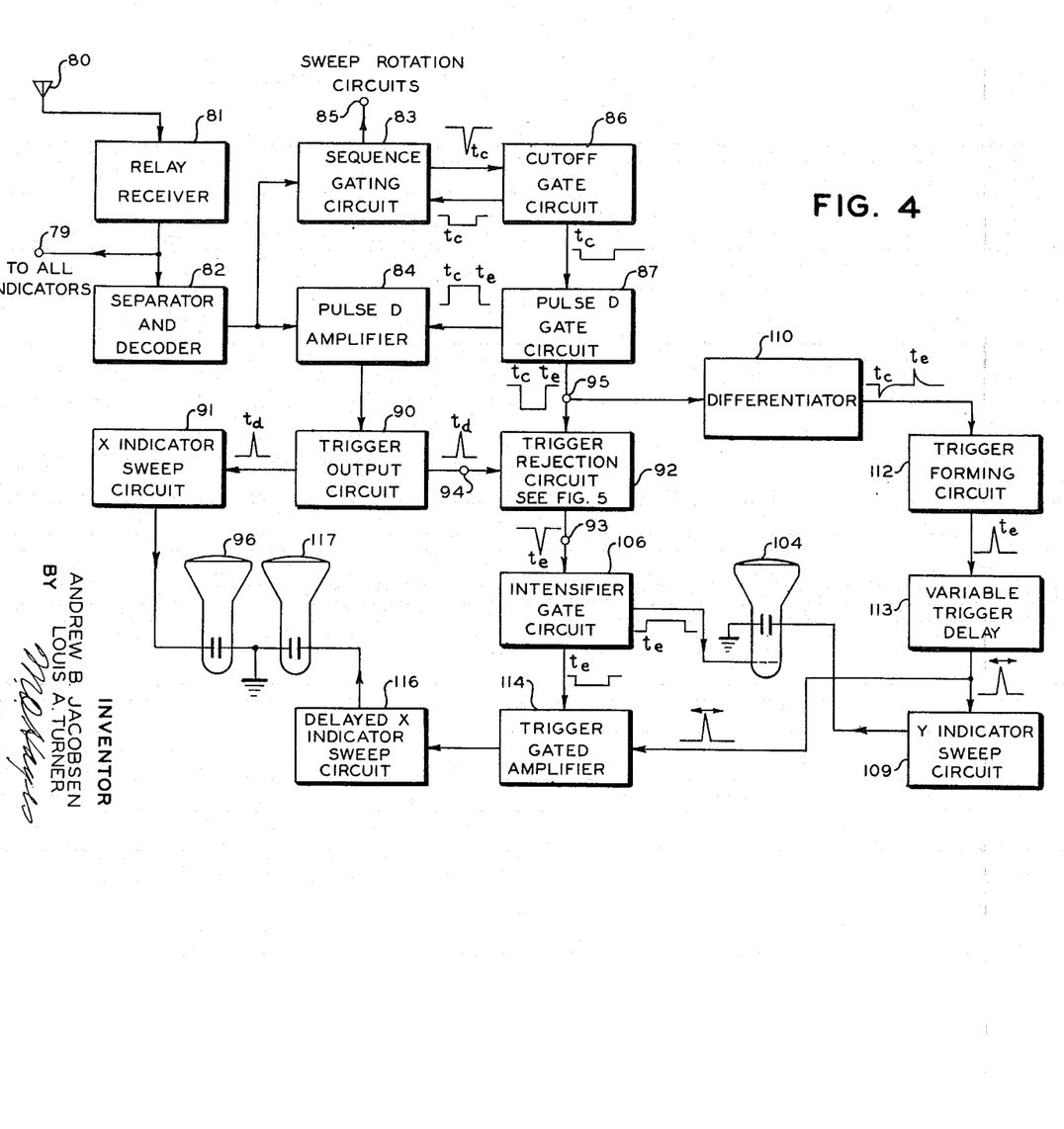
Fig. 4 illustrates in block diagram form one embodiment of the portion of the invention located at the remote ship or shore station.

Since band #2 I.F.F. video must be displayed on Y indicator 104, means must be provided to initiate the sweeps of this indicator at time $t_d$, even though pulse D is not present. For this purpose trigger rejection circuit 92 is used to provide a sharp negative pip at terminal 93 only in the absence of pulse D. The inputs to trigger rejection circuit 92 are a sharp positive pulse at time $t_d$ from trigger output circuit 90 appearing at terminal 94 when pulse D is present, and a negative gate starting at time $t_c$ and terminating at time $t_e$ (approximately 2 microseconds after time $t_d$) appearing at terminal 95. The wave form of the gate appearing at terminal 95 is shown on line 7 of Fig. 1.

Figure 5:
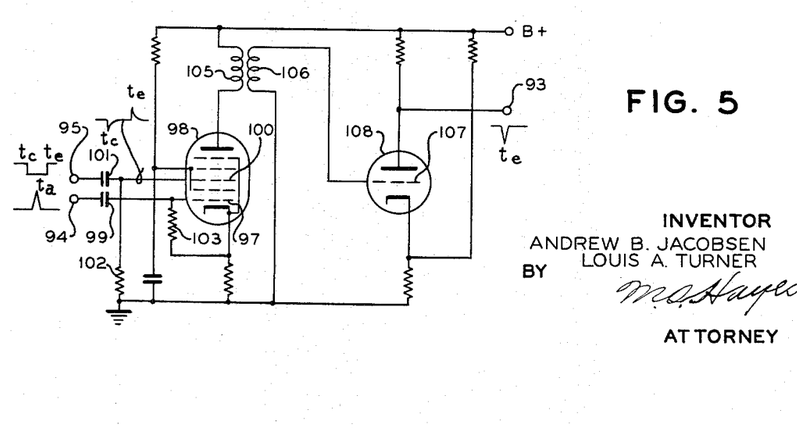
Fig. 5 is a schematic diagram of a portion of Fig. 4.

Referring to Fig. 5, it may be seen that the sharp positive pulse occurring at time $t_d$ is coupled from terminal 94 to grid 97 of tube 98 through condenser 99, and the negative gate starting at time $t_c$ and ending at time $t_e$ is coupled from terminal 95 to grid 100 of tube 98 through condenser 101. Other electrodes of tube 98 are connected as shown. Condenser 101 and resistor 102 form a differentiating circuit, resulting in a sharp negative pip followed by a sharp positive pip being applied to grid 100 of tube 98 due to the differentiation of the gate appearing on terminal 95. When no pulse is present at grid 97 of tube 98 (pulse D absent), the positive pip on grid 100, which occurs at time $t_e$, is sufficient to cause tube 98 to conduct. However, the sharp positive pip at terminal 94, when present, causes grid 97 of tube 98 to draw current, thus charging condenser 99 and resulting in a negative voltage on grid 97 immediately after the passage of the pip at terminal 94, and before the occurrence of the positive pip on grid 100. Resistor 103 is adjusted so that the negative voltage on grid 97 will hold tube 98 cut off until after the passage of the positive pip on grid 100. When pulse D is present the pip at terminal 94 will prevent the positive pip at grid 100 from causing conduction, and no plate current will flow through tube 98. The momentary flow of current through coil 105 when pulse D is absent, will induce a sharp pip in coil 106 at time $t_e$, approximately 2 microseconds after the time pulse D would occur if present. This pip is fed to grid 107 of tube 108 where it is amplified and appears at terminal 93 as a sharp negative pip.

The pip at terminal 93, occurring at time $t_e$ only on repetition cycles containing band #2 I.F.F. video is fed to intensifier gate circuit 106 (Fig. 4) which may be a typical multivibrator forming both a positive and a negative gate starting at time $t_e$. The positive gate is fed to the grid of Y indicator 104 for the purpose of intensifying the trace on the indicator screen for presentation of band #2 I.F.F. video responses.

Y indicator sweep circuit 109 which provides sweep voltages for Y indicator 104, must be triggered on each repetition cycle. For this purpose, the negative gate at terminal 95 is applied to differentiator 110 where it is formed into a sharp negative pip occurring at time $t_c$ and a sharp positive pip occurring at time $t_e$. This signal is fed to trigger forming circuit 112 which may be a conventional blocking oscillator forming a sharp positive pip at time $t_e$ coinciding with the trailing edge of the wave form at terminal 95. This pip is fed to variable trigger delay 113 where a positive trigger is developed which may be delayed after time $t_e$ by an amount determined by the operator of the equipment. The delayed trigger is fed simultaneously to Y indicator sweep circuit 109 and trigger gated amplifier 114. In Y indicator sweep circuit 109, each sweep is initiated by the occurrence of the delayed trigger received from variable trigger delay 113.

It will be appreciated that since tube 96 has been selected for displaying the radar information its sweep, if desired, can be started in synchronism with pulse D, which pulse marks the time of occurrence of the triggering of the radar set. However, since tubes 104 and 107 have been assigned the function of displaying band #1 and band #2 I.F.F. and since these video signals are identified only by the occurrence or nonoccurrence of a preceding pulse D, the sweeps of these pulses must be delayed until the control circuits can recognize whether or not the above pulse is present. This is one reason why the variable trigger delay circuit 113 is incorporated in the system and it is by means of this feature that both the delayed X indicator and Y indicator sweeps are maintained in synchronism even though both of these tubes will never be presenting their I.F.F. information at the same time.

Trigger gated amplifier 114 also receives a negative gate, starting at time $t_e$, from intensifier gate circuit 106 during repetition cycles containing band #2 I.F.F. video (pulse D absent). Under these conditions the delayed pulse from variable trigger delay 113 is not passed through trigger gated amplifier 114. However, on all repetition cycles containing radar video or band #1 I.F.F. video, the gate from intensifier gate circuit 106 is absent, and the delayed trigger from variable trigger delay 113 is amplified by trigger gated amplifier 114 and fed to delayed X indicator sweep circuit 116. Here sweep voltages for delayed X indicator 116 are generated and applied to that indicator for use in presenting radar or band #1 I.F.F. video responses.

Numerous additional applications of the above disclosed principles will occur to those skilled in the art and no attempt has been made to exhaust such possibilities. The scope of the invention is defined in the appended claims.

What is claimed is:

1. A system for alternately passing first and second intelligence signals comprising, means for periodically generating first and second gates at a first pulse repetition frequency, means for periodically generating a third gate at a second pulse repetition frequency, a double coincidence circuit responsive to said first, second and third gates and said first and second intelligence signals for alternately passing said first and second intelligence signals, said first intelligence signal passing during the coincidence of said first and third gates and said second intelligence signal passing during the coincidence of said second and third gates.

2. In a system for the alternate transmission on a single carrier of first and second intelligence signals, means for periodically generating first and second gates at a first pulse repetition frequency, each of said first gates occurring in time between two successive second gates, means for periodically generating a third gate at a second pulse repetition frequency that is an even harmonic of said first pulse repetition frequency, each of said third gates coinciding in time with one of either of said first and second gates, a first coincidence circuit responsive to the application thereto of said first gates, said third gates and said first intelligence signal for passing said first intelligence signal during the coincidence of said first and third gates, a second coincidence circuit responsive to the application thereto of said second gates, said third gates and said second intelligence signal for passing said second intelligence signal during the coincidence of said second and third gates, and means for combining the outputs of said first and second coincidence circuits.

3. Apparatus as in claim 2 and means for periodically generating a third signal during the time intervals between successive third gates and means for combining said third signal with the outputs of said first and second coincidence circuits.

4. In combination with a radar system including means for transmitting radar pulses and for receiving the video responses to said radar pulses, said means including a radar antenna and an identification system including means for transmitting interrogator pulses in synchronism with said radar pulses and for receiving the video responses to said interrogator pulses, a radio relay system for conveying said identification and radar pulses and said video responses to a remote location, said radio relay system comprising, a switching gate generator synchronized with the pulse transmission of said radar system, an antenna position pulse generator operatively associated with said radar antenna for generating pulses in accordance with the position of said radar antenna, said antenna position pulses being generated at the pulse repetition frequency of said radar system, a video gate generator synchronized with said antenna position pulse generator for generating a video gate at the pulse repetition frequency of said radar system, a video switch circuit synchronized with said switching gate generator and said video gate generator, means for coupling said radar and identification video responses to separate inputs of said video switch circuit, said video switch circuit having one of first and second modes of operation, means operatively associated with said video switch circuit for selecting one of said two modes of operation, said video switch circuit when operating in either of said modes allowing the passage, for the duration of any one of said video gates, of one of said radar and identification video responses and blocking the passage of the other of said video responses, said video switch circuit, when operating in said first mode allowing the passage of said radar video responses for the duration of each of said video gates, considering said video gates as being numbered consecutively, said video switch circuit, when operating in said second mode, allowing the passage of said radar video responses during the occurrence of each odd numbered video gate and allowing the passage of said identification video responses during the occurrence of each even numbered video gate, a mixer for combining said radar pulses, said antenna position pulses and the output of said video switch circuit, means for transmitting and receiving the output of said mixer, means for separating said video responses from said radar pulses and said antenna position pulses, means responsive to said separated radar and antenna position pulses for separating said radar pulses from said antenna position pulses, a trigger generator responsive to said separated radar pulses for producing a trigger for each of said radar pulses, said triggers occurring in synchronism with said radar pulses, at least one cathode ray indicator, and an indicator sweep generator coupled to said indicator and responsive to said trigger generator output, said indicator being adapted to display the intelligence contained in radar and information video responses applied thereto.

5. In combination with a radar system including means for transmitting radar pulses and for receiving the video responses thereto, said means including a radar antenna, an identification system including means for transmitting, in one of first and second bands, interrogator pulses in time coincidence with said radar pulses and for receiving the video responses to said interrogator pulses, and a radio relay system for conveying said identification and radar pulses and video responses to a remote location, said radio relay system comprising, a switching gate generator synchronized with the pulse transmissions of said radar system and generating first and second gates, each of said first and second gates having a time duration equal to the time interval between successive radar pulses, the trailing edge of either of said gates being in time coincidence with the leading edge of the other of said gates, an antenna position pulse generator operatively associated with said radar antenna for generating at least one pulse for each radar pulse in accordance with the position of said antenna, a video gate generator synchronized with said antenna position pulse generator for generating a video gate for each of said radar pulses, each of said video gates coinciding in time with a radar pulse, a video switch circuit synchronized with said switching gate generator and said video gate generator, said video switch circuit having at least two input circuits and first and second output circuits, means for coupling said received radar video responses and said identification video responses to separate input circuits of said video switch circuit, a coincidence circuit responsive to said radar pulses and coupled to said second output circuit of said video switch circuit, said video switch circuit having one of first, second and third modes of operation, means operatively associated with said video switch circuit for selecting one of said modes of operation, said video switch circuit when operating in said first mode, allowing the passage of said radar video responses to its first output circuit only for the periodic time intervals during which said video gates coincide with said first and second gates of said switching gate generator, said video switch circuit, when operating in said second and third modes, allowing the passage of said radar video responses to its first output circuit during the periodic time intervals during which said video gates coincide with said first gates of said switching gate generator, and allowing the passage of said identification video responses to its first output circuit during the periodic time intervals during which said video gates coincide with said second gates of said switching gate generator, said video switch circuit when operating in said first and second modes providing a gate signal at its second output circuit enabling said coincidence circuit to pass each of said radar pulses applied thereto, said video switch circuit, when operating in said third mode producing a gate signal at its second output circuit enabling said coincidence circuit to pass only those radar pulses coinciding in time with said first gates of said switching gate generator, and means for combining the outputs of said coincidence circuit, said antenna position pulse generator and said first output of said video switch circuit.

6. In combination, means for periodically generating a series of first reference pulses at a first repetition frequency, means for generating a first intelligence signal in the form of a predetermined number of pulses for each of said first reference pulses, each of said first intelligence pulses being displaced in time from a corresponding first reference pulse, means for periodically generating a series of second reference pulses at said first pulse repetition frequency and displaced by a fixed time interval from said first reference pulses, each of said first intelligence pulses occurring during the time interval between a first reference pulse and a following second reference pulse, means for generating a second intelligence signal in the form of a video signal for each of said second reference pulses, means for generating a third intelligence signal in the form of a video signal for each of said second reference pulses, each of said second and third intelligence video signals being displaced in time from a corresponding second reference pulse so that it occurs during the time interval between a second reference pulse and a following first reference pulse, means synchronized with the occurrence of said first reference pulses for periodically generating first and second gates at one half said first repetition frequency, each of said first and second gates having leading and trailing edges coincident with said first reference pulses, a leading edge of my first gate being coincident with a trailing edge of a second gate, means synchronized with the occurrence of said first intelligence pulses for periodically generating a third gate at said first repetition frequency, each of said third gates having a leading edge coincident with a first intelligence pulse occurring in time before a following second reference pulse and a trailing edge occurring in time before a following first reference pulse, a video switch circuit having one of two conditions of operation, means operatively associated with said switch circuit for selecting either of said conditions of operation, means coupling said first, second and third gates to said switch circuit, means coupling said second and third intelligence video signals to said switch circuit, said switch circuit, when in said first condition of operation, passing said second intelligence video signals during the coincidence of said third gate with either of said first and second gates, said switch circuit, when in said second condition of operation passing said second intelligence video signals during the coincidence of said third gates and said first gates and passing said third intelligence video signals during the coincidence of said third gates and said second gates, and means for combining said first reference pulses, said second reference pulses, said first intelligence pulses and the output of said switch circuit.

7. In combination, means for periodically generating a series of first reference pulses at a first repetition frequency, means for generating a first intelligence signal in the form of a predetermined number of pulses for each of said first reference pulses, each of said first intelligence pulses being displaced in time from a corresponding first reference pulse, means for periodically generating a series of second reference pulses at said first repetition frequency and displaced in time from said first reference pulses by a fixed time interval, each of said first intelligence pulses occurring during the time interval between a first reference pulse and a following second reference pulse, means for generating a second intelligence signal in the form of a video signal for each of said second reference pulses, means for generating a third intelligence signal in the form of a video signal for each of said second reference pulses, each of said second and third intelligence video signals being displaced in time from a corresponding second reference pulse and occurring during the time interval between a second reference pulse and a following first reference pulse, means synchronized with the occurrence of said first reference pulses for generating first and second gates at one half said first repetition frequency, each of said first and second gates having leading and trailing edges coincident with two successive first reference pulses, a leading edge of any first gate being coincident with a trailing edge of a second gate, means synchronized with the occurrence of said first intelligence pulses for periodically generating a third gate at said first repetition frequency, each of said third gates having a leading edge coincident in time with a first intelligence pulse occurring in time before a following second reference pulse and a trailing edge occurring in time before a following first reference pulse, each of said third gates having a duration equal at least to the duration of either of said second and third intelligence video signals, a switch circuit having first and second output circuits, a coincidence circuit, means coupling said second reference pulses to said coincidence circuit, means coupling the first output circuit of said switch circuit to said coincidence circuit, said switch circuit having one of first, second and third conditions of operation, means operatively associated with said switch circuit for selecting any one of said three conditions of operation, means coupling said first, second and third gates to said switch circuit, means for applying said second and third intelligence video signals to said switch circuit, said switch circuit when operating in either of said first and second conditions, coupling through its first output circuit, a signal to said coincidence circuit to allow said coincidence circuit to pass each of said second reference pulses, said switch circuit, when operating in said third condition coupling through its first output circuit, said first gates to said coincidence circuit, to allow said coincidence circuit to pass each of said second reference pulses in time coincidence with said first gates, said switch circuit, when operating in said first condition coupling to its second output circuit said second intelligence video signals in time coincidence with said third gates, said switch circuit, when operating in either of said second and third conditions, providing at its second output circuit second intelligence video signals occurring during the coincidence of said third gates with said first gates and third intelligence video signals occurring during the coincidence of said third gates with said second gates, and means combining the output of said coincidence circuit, said first reference pulses, said first intelligence pulses and the video signals appearing at the second output of said switch circuit.

8. In combination with first and second radio pulse echo detection systems, said first system including, means for generating a series of first reference pulses at a first repetition frequency, means for generating a series of second reference pulses at said first repetition frequency and displaced in time from said first pulses, means including a directional antenna for transmitting said second reference pulses and for receiving the video responses to the arrival of said second reference pulses at a number of remote points, means for generating an intelligence signal in the form of a predetermined number of modulated pulses for each of said first reference pulses, said intelligence pulses being modulated in accordance with the instantaneous position of said directional antenna, said second system including means for transmitting pulses in synchronism with said second reference pulses and for receiving the video responses to the arrival at a number of remote points of said last-mentioned transmitted pulses, means synchronized with the occurrence of said first reference pulses for generating first and second gates at one half of said first repetition frequency, each of said first and second gates having leading and trailing edges coincident respectively with two successive first reference pulses, a leading edge of a first gate being coincident with a trailing edge of a second gate, means synchronized with the occurrence of said antenna position intelligence pulses for periodically generating a third gate at said first repetition frequency, each of said third gates having a leading edge coincident in time with an antenna position intelligence pulse occurring in time before a following second reference pulse and a trailing edge occurring before a following first reference pulse, a switch circuit having first and second output circuits, a coincidence circuit, means coupling said second reference pulses to said coincidence circuit, means coupling the first output circuit of said switch circuit to said coincidence circuit, means coupling said first, second and third gates to said switch circuit, means coupling said video responses of said first and second systems to said switch circuit, said switch circuit having one of first, second and third modes of operation, means operatively coupled to said switch circuit for selecting any one of said modes, said switch circuit when operating in either of said first and second modes coupling through its first output circuit a signal to said coincidence circuit to allow said coincidence circuit to pass each of said second reference pulses, said switch circuit, when operating in said third mode coupling through its first output circuit, said first gates to said coincidence circuit to allow said coincidence circuit to pass each of said second reference pulses in time coincidence with said first gates, said switch circuit, when operating in said first mode, coupling to its second output circuit said video responses of said first system in time coincidence with said third gates, said switch circuit, when operating in either of said second and third modes, coupling to its second output circuit said video responses of said first system during the coincidence of said third gates with said first gates and said video responses of said second system during the coincidence of said third gates with said second gates, and a mixer for combining the output of said coincidence circuit, said first reference pulses, said antenna position intelligence pulses and said video responses at the second output circuit of said switch circuit.

9. Apparatus as in claim 8 and means responsive to the output of said mixer for separating said video responses from said first reference pulses, said second reference pulses and said antenna position intelligence pulses, a gating circuit and a pulse amplifier fed simultaneously, said separated first reference pulses, second reference pulses and antenna position intelligence pulses, a cut-off gate circuit responsive to trigger pulses from said gating circuit occurring in synchronism with said antenna position intelligence pulses for generating and feeding a gate to said gating circuit for disabling said gating circuit during the absence of an antenna position intelligence pulse, a pulse gate circuit responsive to said gate output of said cut-off gate circuit for generating and feeding a gate to said pulse amplifier for enabling said pulse amplifier to pass second reference pulses, means responsive to the output of said pulse amplifier for producing second trigger pulses in synchronism with said second reference pulses applied to said pulse amplifier, a first indicator, a first sweep circuit coupled to said first indicator, means coupling said second trigger pulses to said first sweep circuit for triggering said first sweep circuit, means responsive to the output of said pulse gate circuit for generating third trigger pulses in time coincidence with the gates of said pulse gate circuit, means for delaying said third trigger pulses by a controllable time interval, means responsive to the output of said pulse gate circuit and said second trigger pulses for generating a fourth trigger pulse for each of said gates of said pulse gate circuit occurring during the absence of a second trigger pulse, each of said fourth trigger pulses being in time coincidence with a third trigger pulse, an intensifier gate circuit synchronized with the occurrence of said fourth trigger pulses, an amplifier responsive to said intensifier gates and said delayed third trigger pulses for passing those delayed third trigger pulses in time coincidence with said intensifier gates, a second indicator and a third indicator, a second sweep circuit and a third sweep circuit coupled respectively to said second and third indicators, means for applying said delayed third trigger pulses to said second sweep circuit for triggering said second sweep circuit, means for applying said delayed third trigger pulses passed through said amplifier to said third sweep circuit for triggering said third sweep circuit, means for applying said intensifier gate to said second indicator, whereby when said separated video responses are applied to each of said indicators, said first and third indicators are adapted to indicate said video responses when said switch circuit is operating in either said first or second modes and said second indicator is adapted to indicate said video responses when said switch is operating in said third mode.

References Cited in the file of this patent

UNITED STATES PATENTS

| | | |
|---|---|---|
| 2,208,376 | Luck | July 16, 1940 |
| 2,252,083 | Luck | Aug. 12, 1941 |
| 2,407,199 | Wolff | Sept. 3, 1946 |
| 2,408,048 | Deloraine | Sept. 24, 1946 |
| 2,414,265 | Lawson | Jan. 14, 1947 |
| 2,513,525 | Shenk et al. | July 4, 1950 |
| 2,519,763 | Hoglund | Aug. 22, 1950 |
| 2,519,935 | Smith | Aug. 22, 1950 |
| 2,520,600 | Jones | Aug. 29, 1950 |
| 2,567,862 | Van Voorhis | Sept. 11, 1951 |